Dec. 28, 1926.
T. A. CARLSON
1,612,415
APPARATUS FOR TESTING FIBER BOARD
Filed Feb. 28, 1924 2 Sheets-Sheet 2
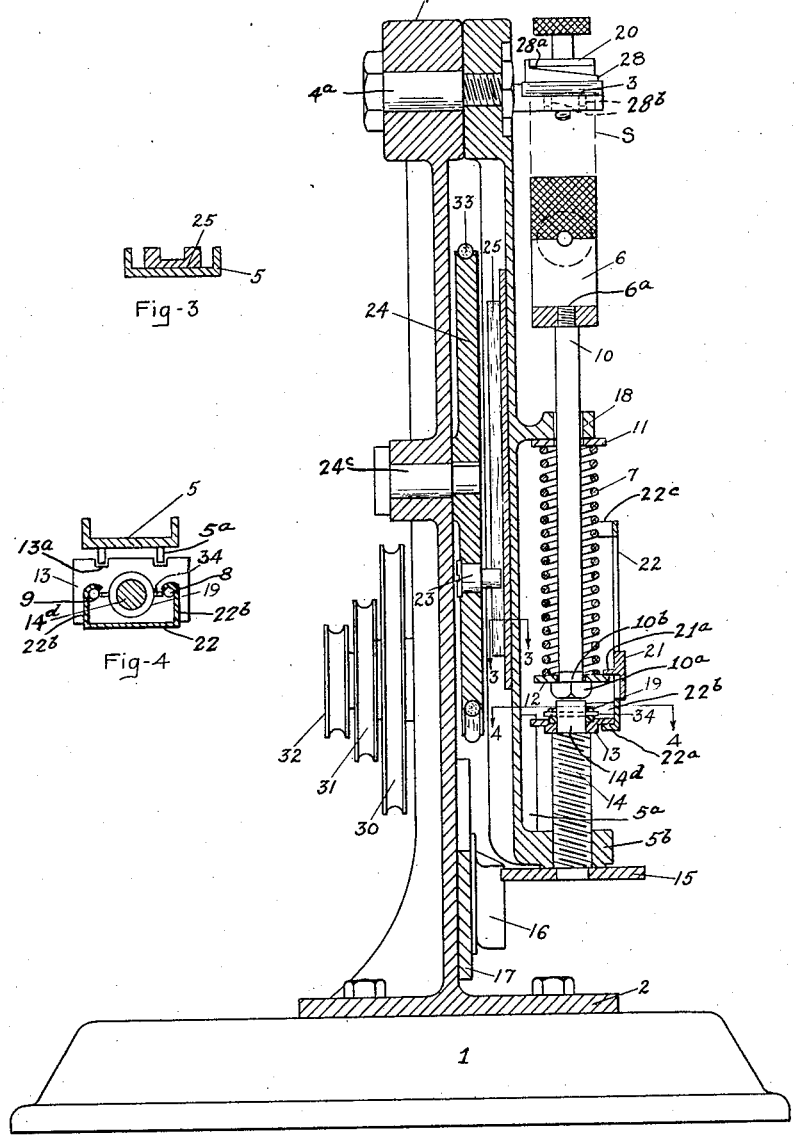
INVENTOR.
THORWALD A. CARLSON
BY
ATTORNEYS.

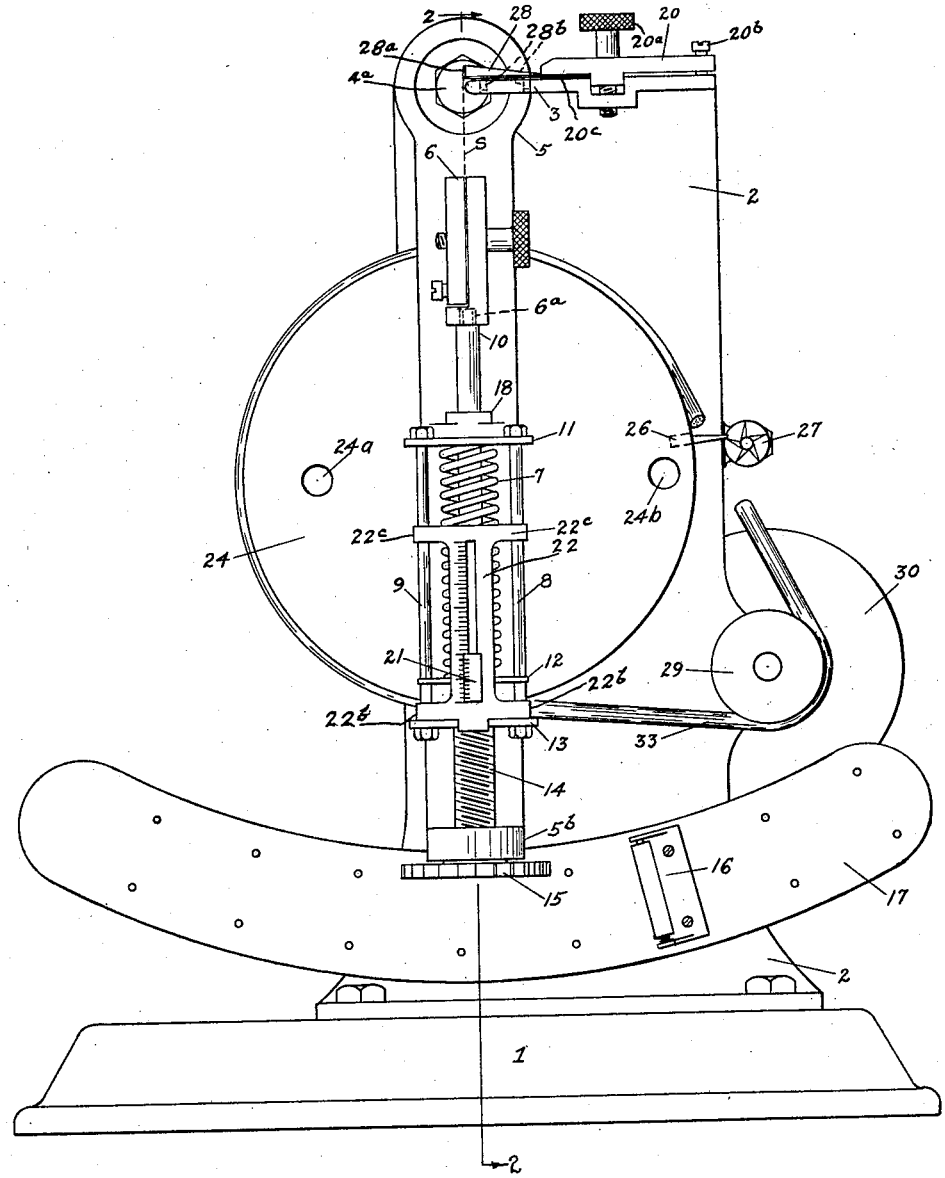

Patented Dec. 28, 1926.

1,612,415

UNITED STATES PATENT OFFICE.

THORWALD A. CARLSON, OF MADISON, WISCONSIN, DEDICATED, BY MESNE ASSIGNMENTS, TO THE CITIZENS OF THE UNITED STATES OF AMERICA.

APPARATUS FOR TESTING FIBER BOARD.

Application filed February 28, 1924. Serial No. 695,754.

(GRANTED UNDER THE ACT OF MARCH 3, 1883; 22 STAT. L. 625.)

This application is made under the act of March 3, 1883, Chapter 143 (22 Stat. 625) and the invention herein described and claimed may be used by the Government of the United States or any of its officers or employees in the prosecution of work for the Government, or by any citizen of the United States, without payment to me of any royalty thereon.

This invention relates to an apparatus for testing built-up fiber board which in practice is subjected to such stresses as tension, bending, and tearing or to a certain combination of these conditions, and is particularly applicable to the determination of the strength of the scored or creased part of fiber board such as is used in making shipping containers, and its application will be described in connection with this material, although it will be evident that in its broader aspects the invention is applicable to other materials.

In the manufacture of fiber board containers the fiber board is marked by scoring or creasing to make the edges of the completed box. It has been found that these scored edges are the weakest part of practically all properly sealed fiber boxes and it is at these edges that the boxes are likely to fail in commercial service. Yet this weakness is not taken into account in the standard methods of testing fiber board which are the basis for specifications in the buying and selling of fiber boxes. While these standard tests are valuable for determining certain qualities of the board from which the boxes are made, they cannot be used to predetermine with accuracy the relative serviceability of different boxes, especially when different lots of boxes are made from the same quality of board, but scored differently.

It is one of the objects of this invention to establish a method of testing whereby the relative serviceability of different fiber boxes may be indicated, and it is intended also that this method of testing shall make possible the determination of the relative values of different kinds of scores or creases for fiber boxes.

It has been found that an indication of the amount of rough handling which a fiber box will withstand may be obtained by applying certain mechanical tests to a specimen which may include a section of one of the scored edges of the box which are ordinarily subjected to the hardest stresses or which tend to fail first in actual usage. The apparatus for testing which is the subject of this invention involves means for applying a combined action of tension, tearing, and repeated bending to a specimen while it is bent over and drawn firmly against a sloping edge. In the case of a scored specimen representing material from an edge of a fiber box, the specimen may be bent initially at an angle of approximately 90 degrees, the bend being parallel to and at the score, so that the score may be in contact with the sloping edge during test. The number of times that the specimen is bent through a predetermined angle, together with the maximum tension applied before the specimen is torn apart, is taken as an indication of the amount of rough handling which the box will withstand. In any particular test, comparison may be made with values derived from some one specimen assumed as standard, although it is obvious that in comparing two or more specimens for relative serviceability, reference to a standard would be unnecessary.

Another object of this invention relates to a convenient mechanism for making the tests. Generally speaking, this machine consists of clamping, tensioning, and oscillating devices by means of which the test specimen is subjected to tearing, tension, and repeated bending about a sloping edge. In the machine to be described, for example, one of the clamps, which is stationary, consists of an adjustable jaw mounted on a fixed jaw having an extension in the form of a plate with a transversely sloping edge over which the test specimen is bent. The other clamp is carried by an oscillating arm which is equipped with mechanism tending to stretch the test specimen by drawing the clamp away from the axis of oscillation of the oscillating arm. The oscillating arm is provided with a suitable driving means to move it back and forth through the desired angle. The two clamps are so placed that when the oscillating arm is in its central position the planes of the clamping surfaces are at right angles to one another, intersecting, if extended, in a line approximately at the axis about which the oscillating arm oscillates.

In making the test the specimen is bent over the sloping edge, which edge is located approximately on a line through the axis of rotation of the oscillating arm, and the ends of the specimen are held by the two clamps. Thus the specimen assumes a position simulating that in which the material occurs in a set-up and loaded box. When the machine is set in motion the specimen is bent back and forth at the sloping edge and the tension caused by the forces applied to the movable clamp causes the specimen to tear along the sloping edge. By using, for the extension of the fixed jaw of the stationary clamp, plates terminating in edges having different degrees of inclination or slope, the severity of the tearing action to which the specimen is subjected can be varied at will. Suitable means are provided for determining the number of bends and the maximum tension which the specimen sustains before failure occurs.

In the drawings illustrating this invention:

Fig. 1 is a view in front elevation of a machine embodying the features of the invention.

Fig. 2 is a vertical cross-sectional view taken on line 2—2 in Fig. 1.

Fig. 3 is a cross-sectional view of the oscillating arm taken on line 3—3 in Fig. 2.

Fig. 4 is a cross-sectional view of the oscillating arm taken on line 4—4 in Fig. 2.

As shown in the drawings, 1 designates a supporting base upon which is mounted a pedestal 2. The upper part of the pedestal 2 is provided with a horizontal ledge 3 which is an integral part of the pedestal 2 and with an apertured boss 4. Through the aperture in the boss extends a bolt $4^a$, which is rotatable in the aperture but is rigidly secured to the oscillatable arm 5. On the horizontal ledge 3 is mounted the movable jaw 20, which co-operates with the ledge 3 to form therewith what I term the stationary clamp.
ary clamp. This clamp is similar in principle to a leverage system in which the force is applied through the thumbscrew $20^a$, the fulcrum is represented by the adjusting screw $20^b$ which also serves to adjust the clamp for specimens of different thicknesses, and the resistance is afforded by the gripping surface $20^c$ which holds the test specimen. The thumbscrew $20^a$ bears on the top surface of clamp 20, and has a reduced threaded portion which passes loosely through the hole in clamp 20 and screws into a correspondingly tapped hole in ledge 3. The arm 5, through its pivotal connection $4^a$, may be oscillated about an axis concentric with the boss 4, and the arm is provided midway of its length with a forwardly-directed apertured projection 18 and at its lower end with a similarly apertured ledge $5^b$, the two apertures being in alinement and the aperture of the ledge being threaded to receive an adjusting screw 14. Slidably mounted in the aperture of the projection 18 is the rod 10 having a head $10^a$ at its lower end and carrying at its upper end what I term the movable clamp 6, generally similar in structure to the stationary clamp, and having a tapped hole $6^a$ to receive the threaded upper end of rod 10. The screw 14 has a reduced stud $14^d$ at its upper end, upon which is mounted collar 19 held in place by a pin 34; and on the stud, between the collar and the shoulder at the base of the stud, is mounted an elongated plate 13 having perforations near each end, as shown in Fig. 4, and notches $13^a$ in its edge that is adjacent the arm 5. Said notches are adapted to cooperate with longitudinal ribs $5^a$ on the arm to prevent the plate from turning with the screw 14. Bolts 8 and 9 extend upwardly through the end perforations respectively of the plate 13, their heads bearing against the lower side of the plate. The threaded upper ends of the bolts extend through apertures in a plate 11, above which they are provided with nuts, the bolt apertures in the plates 13 and 11 being correspondingly spaced and plate 11 having a central aperture through which loosely passes the rod 10. Resting against the head $10^a$ in the lower end of the rod is a plate 12 having a central square aperture to receive a correspondingly square portion $10^v$ of the rod, whereby the rod is held against turning with reference to the plate, the latter having near its ends apertures through which respectively the bolts 8 and 9 loosely pass. A helical spring 7 surrounds the rod 10 with its ends respectively in engagement with the plates 11 and 12, whereby it tends to push the plates apart.

The oscillating arm 5 is driven by a driving pin 23, Fig. 2, mounted in one of the openings $24^a$, $24^b$, etc., provided in the pulley 24, which in turn is secured to pintle $24^c$ pivotally mounted in the pedestal 2. One end of the driving pin 23 slides in a slotted guide 25 secured to the back of the oscillating arm 5. This slotted guide 25 and the oscillating arm 5 are shown in cross section in Fig. 3. The oscillating arm 5 can be made to oscillate through any one of different angles simply by screwing the driving pin 23 into the proper one of the tapped holes $24^a$, $24^b$, etc., provided in the pulley 24. Correspondingly, spaced pairs of tapped holes are provided in the sector 17 so that different numbers of pawls 16 may be used.

On the horizontal ledge 3 is mounted as the lower extended jaw of the stationary clamp 20 a plate 28 detachably secured in place by means of its pegs $28^b$ which fit snugly into corresponding holes in ledge 3. The edge $28^a$ of this plate 28 about which the test specimen is bent is inclined, as shown in Fig. 2, so that its action on the specimen is one of tearing in addition to tensioning and bending. Since the plate 28 is detachable, different plates can be substituted, so that the specimen may be subjected to bending and tearing actions of varying relative intensity.

The specimen to be tested must be bent initially through an angle of about 90 degrees before being mounted in the machine. As shown in Fig. 1, one end of the specimen S is fastened in the stationary clamp 20 and the other in the movable clamp 6. When it is intended to test the scored or creased portion of fiber board or of a fiber box, it will be understood that the specimen should be bent at the score and that it will be mounted in the machine with the score at the sloping edge 28ª of the plate 28. In order to obtain a fair comparison between different specimens it is best to subject all specimens to the same initial tension before the testing machine is set in motion. This may be accomplished after the specimen is fastened in the clamps by turning the ratchet 15 until the desired amount of tension is indicated. The tension applied to the specimen is registered by means of a calibrated vernier 21 sliding in a slot in the frame 22. This frame 22 is fastened to and is made to move with the plate 13 by means of its lip 22ª which extends underneath the plate 13, as shown in Fig. 2, and by the extension of its two arms 22ᵇ which rest on the upper surface of the plate; and the frame 22 is also held in place by the arms 22ᵇ and 22ᶜ which terminate in loops encircling the bolts 8 and 9 in the manner shown in Fig. 4. As the spring 7 is compressed, the calibrated vernier 21 is moved relatively to the frame 22 by virtue of the contact of its projecting arm 21ª with the upper surface of the plate 12, and when the specimen fails, releasing the compression in the spring 7, the calibrated vernier 21 remains at the point on the graduated scale marking the maximum tension applied to the test specimen.

In order to register the number of bends to which a specimen is subjected, a counter 27 is mounted on the pedestal 2. This counter is actuated by a finger 26 attached to the pulley 24, so that each revolution, corresponding to one complete oscillation of the specimen, is recorded.

Although the pulley 24, as shown, is connected to the source of power through the belt 33 driven by a pulley 29, which in turn is driven by one of the intermediate pulleys 30, 31, or 32 which serve to vary the speed of operation, any of the well known methods of applying power and varying the speed may be used.

What is claimed is:

1. In a machine for testing an elongated strip of sheet material, the combination of a member having a straight edge over which the strip may be transversely bent between its ends, two clamps respectively for gripping the ends of the strip thus bent, means for applying tension to the strip through one of the clamps and means for measuring the tension so applied, said clamps having flat gripping faces and being so angularly related that the faces for one clamp, when closed, will be in a plane, which, if extended, would intersect the corresponding plane for the other clamp, such intersection being, of course, in an imaginary straight line in close proximity to the straight edge but slightly inclined thereto, whereby the portion of the strip adjacent one of its longitudinal edges will be preponderantly tensioned, the clamps being radially disposed with reference to said line between imaginary planes similarly related to both clamps and perpendicular to said line.

2. The mechanism as set forth in claim 1, in combination with means for so mounting one of the clamps that it may be swung about an axis substantially coinciding with said imaginary line of intersection and means for imparting such swinging movement.

THORWALD A. CARLSON.